(No Model.)

S. F. STOWE.
CAKE OR BREAD BEATER.

No. 376,420. Patented Jan. 10, 1888.

WITNESSES:
Chas. H. Luther
Willis Fowler

INVENTOR:
Samuel F. Stowe
by Joseph A. Miller & Co
Attys

UNITED STATES PATENT OFFICE.

SAMUEL F. STOWE, OF PROVIDENCE, RHODE ISLAND, ASSIGNOR OF ONE-HALF TO WILLIAM G. KELLEY, OF SAME PLACE.

CAKE OR BREAD BEATER.

SPECIFICATION forming part of Letters Patent No. 376,420, dated January 10, 1888.

Application filed August 29, 1887. Serial No. 248,124. (No model.)

*To all whom it may concern:*

Be it known that I, SAMUEL F. STOWE, of Providence, in the county of Providence and State of Rhode Island, have invented certain new and useful Improvements in Cake or Bread Beaters, of which the following is a full, clear, and exact description, reference being had to the accompanying drawings, forming part of this specification.

This invention relates to apparatus for mixing and beating cake or bread dough, and has especial reference to a machine adapted for making sponge for sponge-cake.

The objects of my invention are to provide a beater by which the sponge may be sufficiently aerated and may be thoroughly mixed and beaten in a cleanly and efficient manner and with much more expedition and convenience than hand-beating.

To the aforesaid purposes my invention consists in the certain novel and peculiar arrangement and construction of the various parts of the apparatus, all as hereinafter fully described and claimed.

Figure 1:
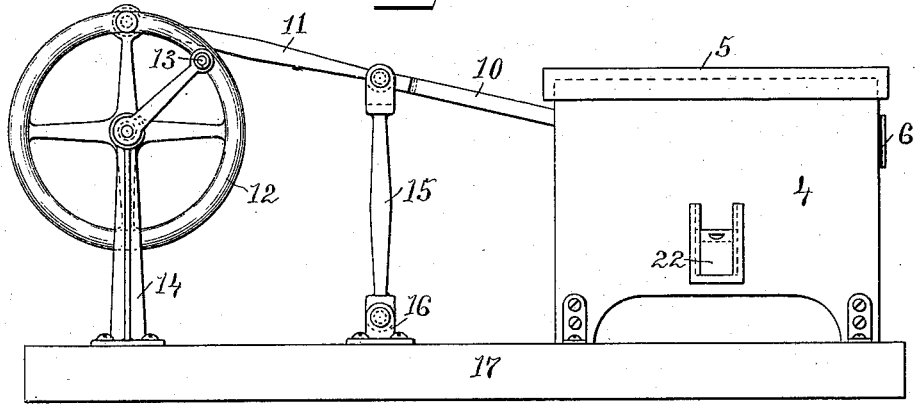
Figure 2:
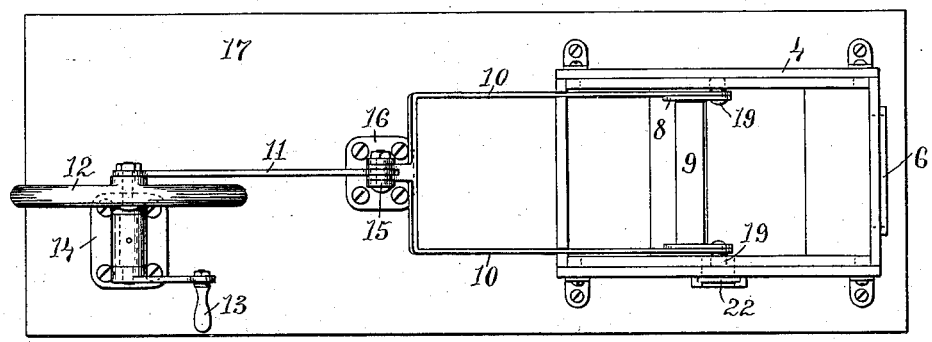
Figure 3:
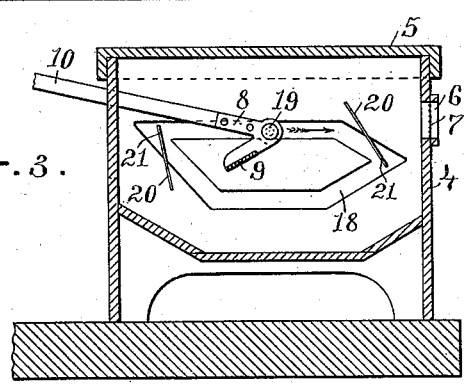

In the accompanying drawings, illustrating my invention, Figure 1 is a side view of my improved beater, and Fig. 2 is a top plan view of the same with the cover omitted. Fig. 3 is a vertical longitudinal view of a portion of the beater, and shows the interior of the beater-chamber in which works the beater, shown as broken off.

In the said drawings like numbers of reference designate corresponding parts throughout.

Referring to the drawings, the number 4 designates the beater-chamber, which is provided with the removable cover 5 and formed with the air-vent 6, having the gauze covering 7 stretched thereover, and through which the fresh air is admitted to the beater-chamber to aerate the sponge while the same is being mixed and beaten. In the side of the chamber 4 is constructed the gate 22, by means of which the sponge may be drawn off when in soft condition.

The beater 8 is composed of a flat member, 9, which is mounted rigidly between the bars 10, which are jointed to the connecting-rod 11. The rod 11 is pivoted to the hand-wheel 12, provided with the handle 13 and mounted in the stand 14, and by means of which the rod and connected beater 8 are reciprocated. The connecting-rod 11 is supported in operative position by the link 15, which is pivoted thereto and hinged at its foot to the post 16, which is fixed upon the base-board 17 of the machine.

I impart to the reciprocating beater an irregular or zigzag motion, the path of which motion about a horizontal axis may be illustrated by the course of the guide grooves or ways 18, which are formed in the inner faces of the opposite side walls of the beating-chamber 4. The beater is provided with two lateral and oppositely-projecting thimbles or projecting guides, 19, which travel in the ways 18, and may, if preferred, be made of glass or porcelain in order not to taint the sponge, as metal would be apt to do. The reciprocating beater is forced to perform the zigzag motion by virtue of the guideways 18 and the co-operating springs 21, which are non-metallic strips secured in the cuts 20, made in the walls of the chamber 4, and disposed with their free ends projecting in the guideways 18, so that when, for instance, the beater is moved along in the direction of the arrow in Fig. 3 and reaches the right-hand end of the way the spring 21 will be forced out of normal position and then snap back into its normal position, and thus present a resistance to the moving beater should the reciprocation of the same endeavor to return the beater in the same upper line or plane of its motion. The beater then travels along the lower part of the ways, and by the office of the spring 21 at the left hand the beater is compelled to move along the upper plane, and thus the beater is made to reciprocate in the path of the ways 18 at each complete stroke of the same. The springs 21 bear upon the thimbles 19, and the use of these springs prevents the rectilinear reciprocating motion of the beater, which might otherwise occur, because of the tendency of the beater to move back and forth in either the upper or lower lines of the zigzag path of the ways 18.

By the use of my improved beater all likelihood of the contamination of the sponge by contact with the hand is avoided, and any desired quantity of the sponge may be beaten at one making. No deleterious effects from the heating of the sponge by contact with the hand can occur, and by the thorough beating and intermixing of air the sponge is greatly increased in quantity, and a cake of much larger size can be produced from the same quantity of materials than by the old methods of beating or mixing.

I prefer to make the non-metallic springs 21 out of whalebone; but any of the well-known woods or other substances usually employed in place of metallic springs may be used instead of the whalebone springs.

It may also in many instances be found desirable that the air entering the chamber 4 should be quite moist. This may be accomplished by simply dampening the gauze covering to the air-vent 6.

There may be various modifications made in the several parts of my device without substantially departing from the spirit of my invention as herein described and claimed.

Having thus described my invention, I claim as new and desire to secure by Letters Patent—

1. The combination, with the beater-chamber 4, provided with the zigzag guideways 18, of the beater 8, working in said ways and having means for operating the beater, whereby the zigzag reciprocating motion about the horizontal axis is obtained, substantially as and for the purpose herein described.

2. The combination, with the beater-chamber 4, provided with the zigzag guideways 18, and with the air-vent 6 and the gate 22, of the beater 8, provided with the means for reciprocating the beater, substantially as and for the purpose herein described.

3. The combination, with the beater-chamber 4, provided with the ways 18 and the springs 21, of the beater 8, having the guide projections 19, working in the ways 18, and provided with means for reciprocating the beater, substantially as and for the purpose herein described.

4. The combination, with the beater-chamber 4, provided with zigzag guideways 18 and the beater 8, working in said ways, of the hand-wheel 12 and the connecting-rod 11 intermediate the wheel and beater, and the link 15, for supporting said rod, substantially as and for the purpose herein described.

In witness whereof I have hereunto set my hand.

SAMUEL F. STOWE.

Witnesses:
WILLIAM G. KELLEY,
JOSEPH A. MILLER, Jr.